Oct. 27, 1964   F. C. I. MARCHANT   3,153,906
AIRCRAFT PROPULSION POWER UNITS
Filed Dec. 13, 1961   3 Sheets-Sheet 3
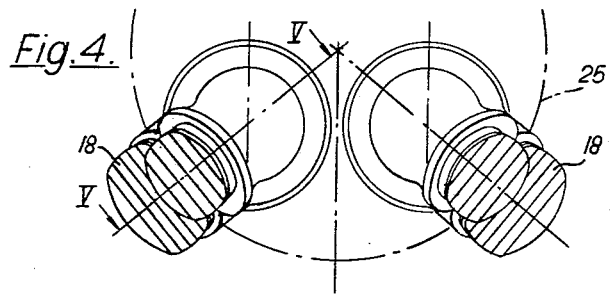
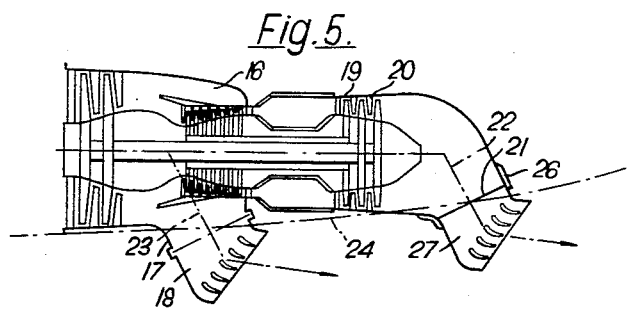
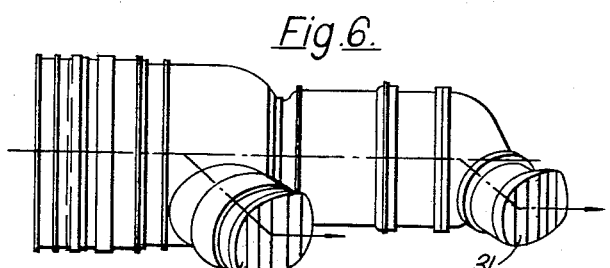
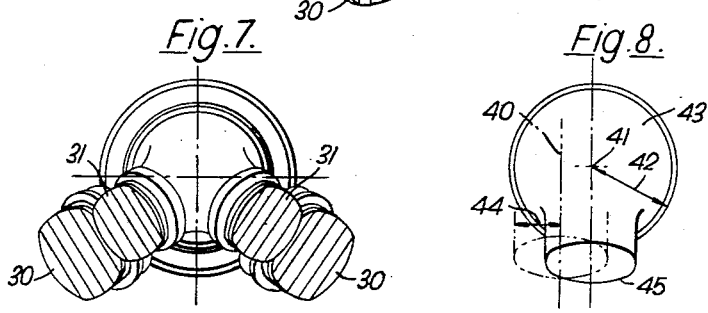
Inventor
Frances Charles Ivor Marchant
By
Bailey, Stephens Huette
Attorneys

United States Patent Office 3,153,906
Patented Oct. 27, 1964

3,153,906
AIRCRAFT PROPULSION POWER UNITS
Francis Charles Iver Marchant, Bristol, England, assignor to Bristol Siddeley Engines Limited, Bristol, England, a British company
Filed Dec. 13, 1961, Ser. No. 159,106
Claims priority, application Great Britain, Dec. 15, 1960, 43,218/60
5 Claims. (Cl. 60—35.55)

This invention relates to aircraft propulsion power units which comprise: an axial flow compressor including a casing with a front intake end and a rear discharge end, and a rotor mounted within the casing on a fore-and-aft axis of rotation; a gas turbine arranged behind the compressor and including a casing of smaller external diameter than the external diameter of the compressor casing, and a turbine rotor, which is coaxial with the compressor rotor and drivingly connected thereto; an annular chamber between the compressor casing and the turbine casing, connected to receive air from the compressor; a lateral outlet from the annular chamber, substantially defined as to direction and cross section by the axis and inner periphery of an annular bearing; and an elbow nozzle mounted on the annular bearing for a range of angular movement about the axis of the bearing; the nozzle being constructed to deflect air through an angle from the direction of the axis of the bearing.

In use, for forward flight the nozzle is oriented to discharge air substantially rearwards, while for take-off and for landing the nozzle is oriented to discharge air substantially downwards.

In power units according to the present invention: the axis of the bearing lies in a fore-and-aft plane which is inclined to the transverse horizontal direction at a droop angle between 15° and 45°, and which approaches the rotor axis to within a distance having a magnitude between zero and the difference between the maximum external radii of the compressor casing and of the annular bearing; the axis of the bearing, as viewed in a direction perpendicular to the said inclined fore-and-aft plane, is inclined to the rotor axis at a divergence angle between 50° and 75°; the nozzle is constructed to deflect air through a deflection angle having a magnitude between the divergence angle and 8° less than the divergence angle; the droop angle is approximately the complement of the deflection angle; and the inclinations are in senses whereby flow through the outlet into the elbow nozzle is directed obliquely downwards, rearwards, and laterally outwards from a vertical fore-and-aft plane.

In practice it is desirable that the resultant of all propulsive forces on an aircraft shall act in a central vertical fore-and-aft plane. Accordingly either the annular chamber may have two lateral outlets, each with an associated nozzle, one on each side; or an aircraft may have two power plants, one a mirror image of the other so far as its outlet and nozzle is concerned.

Such arrangements are advantageous in several respects in comparison with known arrangements using 90° elbow nozzles and diametrically opposite outlets from the annular chamber. Thus, the projected frontal area of the unit may be reduced, air turning losses in the elbow nozzles and in the annular chamber may be smaller, and in some cases the unequal spacing of the outlets around the annular chamber may alleviate vibration of the compressor rotor blades.

The invention illustrated by the accompanying drawings in which:

FIGURE 3 is a view of the nozzle of FIGURE 2 seen in the direction of the arrow B;

FIGURE 4 is a rear view of a pair of power units of a second kind, each having one air nozzle and one gas nozzle;

FIGURE 5 is a section of one of the power units on the line V—V in FIGURE 4;

FIGURES 6 and 7 are a side elevation and rear elevation of a third power unit having a pair of air nozzles and a pair of gas nozzles; and FIGURE 8 is a diagram showing the range of possible outlet positions.

Figure 1:
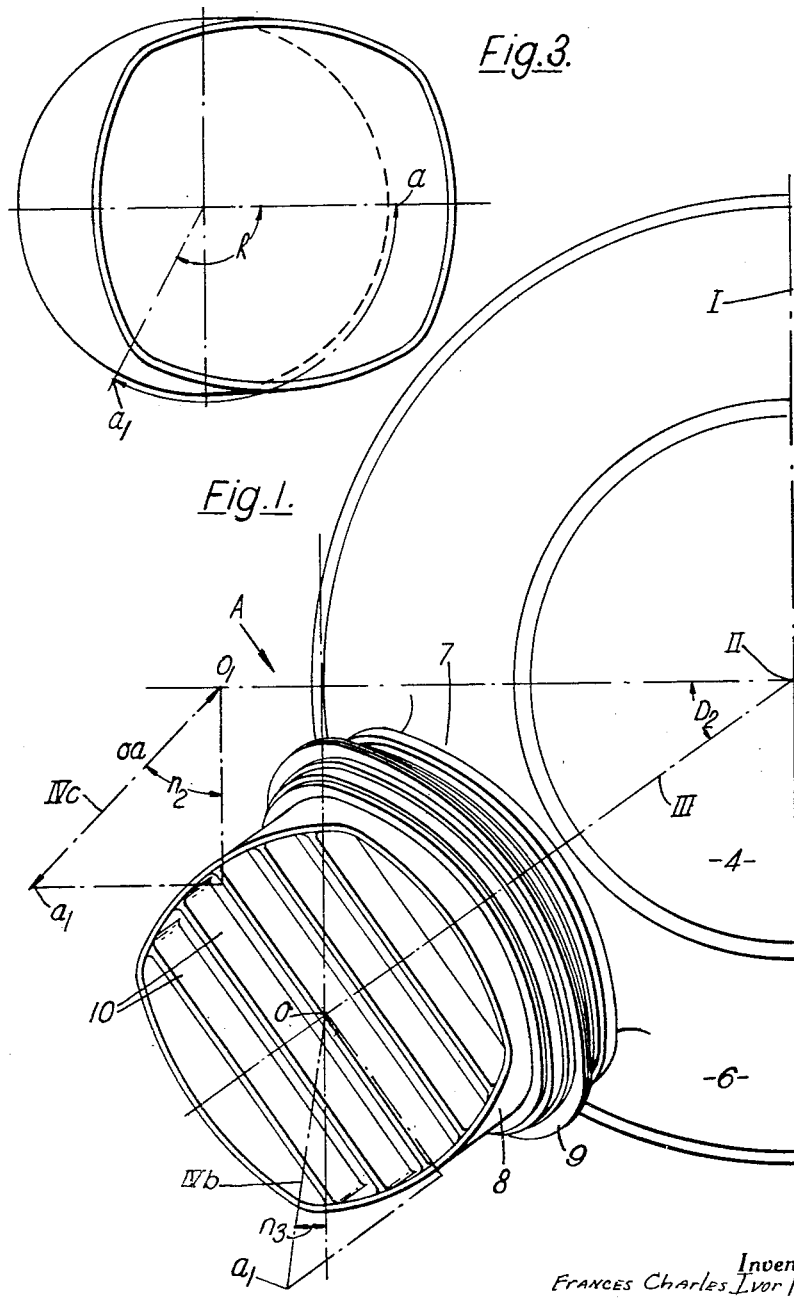
FIGURE 1 is a half view on one side of a vertical plane I containing the rotor axis II of one power unit, looking forwards from a position just reaward of the elbow nozzles.
Figure 2:
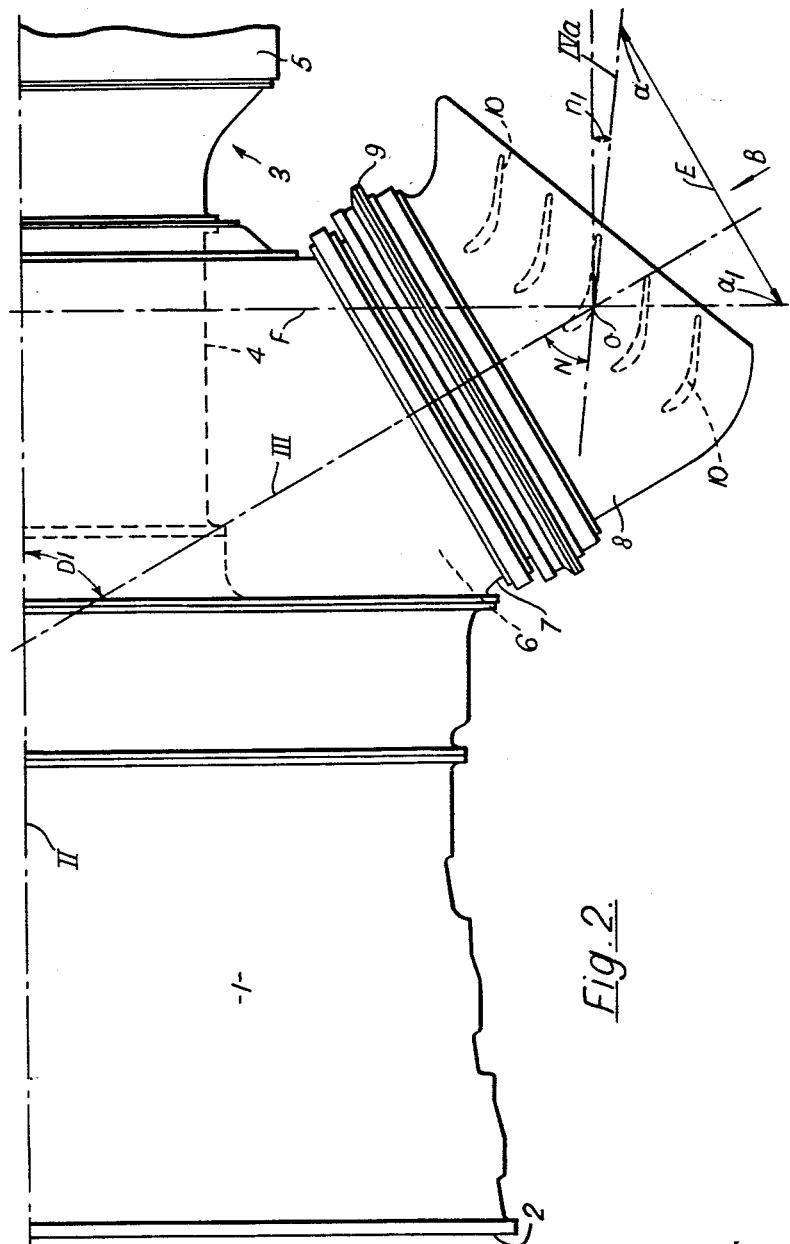
FIGURE 2 is a view in the direction of the arrow A in FIGURE 1, i.e. perpendicular to a plane containing the rotor axis and the axis of that stub outlet duct which is shown in FIGURE 1.

As may be seen from FIGURE 2, the power unit shown in FIGURES 1 to 3 comprises an axial flow compressor 1 at its front end, having an air intake 2, and a coaxially arranged gas turbine engine 3 including a high pressure compressor 4 and a combustion chamber 5. The turbine end of the engine is not shown. It includes a conventional high pressure rotor coupled to drive the rotor of the high pressure compressor 4 and a conventional low pressure rotor coupled to drive the rotor of the compressor 1 by a shaft which passes coaxially through the high pressure rotary assembly. The top side of the unit, i.e. the side which will be uppermost when an aircraft in which the units is installed is in level flight, is at the top in FIGURE 1. It will be understood that, if one is considering the power unit when it is not in place in an aircraft, the arrangement of the lubrication and fuel supply systems determines which side is to be the top of the engine in normal operation.

Some of the air compressed by the compressor 1 is discharged into the intake of the compressor 4 for further compression, heating in the combustion chamber 5 and use for driving the gas turbine rotors, and the remainder enters an annular chamber 6.

This annular chamber has a pair of outlets in the form of tub ducts 7 arranged symmetrically on opposite sides of the vertical plane I. The direction of discharge of each duct 7 is outward from the rotor axis II and parallel to the duct axis III, the latter passing through or close to the rotor axis II (see FIGURE 1). In this example the chamber 6 is purely a plenum chamber but it may be provided with combustion equipment for heating the air.

An elbow propulsion nozzle 8 having a cascade of deflector vanes 10 is provided to receive the air discharged from each duct 7 and is journalled in an annular bearing 9, arranged for attachment to the aircraft structure, so as to be rotatable round the duct axis III. Suitable sealing means are provided to prevent escape of air from between the duct 7 and the nozzle 8. By inclining the duct axis III rearwardly at an acute divergence angle $D_1$ from the rotor axis II, as shown in FIGURE 2, instead of directing the duct at right angles to the rotor axis, it is possible to tuck the nozzle 8 and its bearing assembly more closely into the side of the unit, thereby reducing its projected frontal area, and also permitting the unit to be installed in an aircraft body or nacelle of smaller cross sectional dimensions, which is of benefit in reducing the aerodynamic drag and the weight of the aircraft. The arrangement of the bearing assembly as close as possible to the rotor axis reduces the outlet duct 7 to vestigial proportions and it is convenient to say that this duct is substantially defined as to direction and cross-section by the axis and inner periphery of the annular bearing.

When the duct axis III is inclined in this way instead of being perpendicular to the rotor axis II, it is necessary to reduce the air deflection angle N of the nozzle correspondingly, to restore its capability of producing thrust in the original direction substantially parallel to the rotor axis II, N being equal to the divergence angle $D_1$ if thrust is to be produced truly parallel to the rotor axis II. However, in the present example N is made smaller than $D_1$ by a small angle $n_1$ so that the centre line IV$a$ of the jet is directed that much away from the rotor axis II to take the jet clear of the aircraft body or nacelle housing the power unit.

Considering a point $a$ on the centre line IV$a$ at a distance $oa$ from the intersection of axis III and centre line IV$a$, when the nozzle 8 is rotated about the axis III this point moves in a plane E normal to the axis III and reaches a position $a_1$ when the centre line has been turned downwardly into a position IV$b$ (FIGURE 3) in a plane F which is normal to the rotor axis II. The path of the point $a$ to $a_1$ is shown in FIGURE 3 and corresponds to rotation of the nozzle 18 through angle R, which is somewhat greater than 90°. If the duct axis III were in a horizontal plane so that $o$ were at $o_1$ as seen in FIGURE 1, the jet centre line IV$c$ would then diverge outwardly from the vertical by an angle $n_2$ whose sine is the projection of $oa$ (seen in FIGURE 2 as $oa_1$), divided by the true length of $oa$. By rotating the plane containing the rotor axis II and the duct axis III downwardly about the rotor axis through an angle, conveniently referred to as the droop angle, which is approximately the complement of the air deflection angle N, the jet centre line could be made vertical, but only at the expense of an increase in the divergence of the jet from the fore-and-aft direction when the nozzle is turned back for forward propulsion. A compromise value of the droop angle $D_2$, generally less than the complement of the air deflection angle N, is therefore selected according to whether fore-and-aft or vertical thrust losses are the more objectionable in a particular installation.

Among the features of the present invention are that $D_1$, $D_2$, and $n_1$ should lie within specified ranges. These ranges distinguish practical constructions having significant advantages from constructions which are of little value or advantage.

The range of values of $D_1$ is between 50° and 75°, and the range of values of $D_2$ is between 15° and 45°. The range of values of $n_1$ is between 0° and 8°. These angles are related to one another and to the positions of the nozzle, chosen within its range of angular movement, for take-off, horizontal flight, and landing respectively. One relation is that the sum of $D_1$ and $D_2$ should approximate to 90°, or more nearly to 90° plus $n_1$.

If $D_1$ is too great and $D_2$ is too small, then the reduction in projected frontal area, as compared with a power unit having diametrically opposed outlets and 90° elbow nozzles, is not of much significance. If $D_1$ is too small and $D_2$ is too great, then the outlet duct encroaches on the turbine, and has to be of substantial length to enable the nozzle to be outside the fuselage or nacelle. If $n_1$ is too large, the component of thrust in the fore-and-aft direction in forward flight is significantly reduced.

In the example shown in FIGURES 1 to 3, the divergence angle $D_1$ and the droop angle $D_2$ are 60° and 35° respectively, while the air deflection angle N is 54°, so that in the forward flight position shown in FIGURE 2 the jets diverge 6° from parallelism with the rotor axis II. The digergence from the vertical, when the nozzles are rotated into their direct lift positions, is then about 8°, the loss of lift being therefore about 0.97%, i.e. $(1 - \cosine n_3)\ 8°$.

It will be appreciated that, due to the droop angle $D_2$, the jet centre lines IV$a$ will have a small downward slope relatively to the rotor axis II so that a lift component will be produced at right angles to the rotor axis. This component can be varied by rotation of the nozzles and, depending on the characteristics of the aircraft, efficiency may well be increased by rotating the nozzles to set the jet centre lines at an increased downward slope.

The gases exhausted from the driving turbine may also be discharged into a plenum chamber having similarly arranged stub outlet ducts and elbow propulsion nozzles. Since ordinarily there would be no necessity for the exhaust gas plenum chamber to have transverse dimensions as large as those of the air plenum chamber, the inclined arrangement of the stub duct axes does not in this case permit a reduction in the projected frontal area of the unit. It does however allow the unit to be accommodated in a shorter body or nacelle since the latter can commence tapering from a more forward position.

FIGURES 4 and 5 show power units in each of which the annular chamber 16 has a single stub outlet duct 17 with an associated elbow nozzle 18. In addition, the gas which has passed through high and low pressure turbines 19, 20 is discharged through an outlet 21 defined by a bearing 26 having an axis 22 parallel to the axis 23 of the duct 17, and associated with the outlet 21 is an elbow nozzle 27 similar to the nozzle 18. Means, not shown, are provided for moving the nozzles in unison. Because of the different flows, the two outlets are of different cross sectional area.

The two power plants are housed within a fuselage. In FIGURE 4, the line 25 indicates the shape of the fuselage wall in a transverse plane through the outlets 17. In FIGURE 5, the line 24 indicates the shape of the fuselage wall in the plane of the figure.

FIGURES 6 and 7 show a single power unit having a pair of air outlets with nozzles 30, and a pair of gas outlets with nozzles 31. Each pair of outlets has a cross sectional area equal to the area of the corresponding single outlet in FIGURES 4 and 5.

The stub ducts are made no longer than is necessary to achieve a layout in which the compressor and turbine are enclosed in a fuselage or nacelle while the nozzles are outside. In fact the annular bearing may be so close to the annular chamber as to be in a plane tangent to the general shape of the chamber wall.

In the previous examples, the axes of the outlets intersect the rotor axis. This is not essential. FIGURE 8 is a diagrammatic rear view of the annular chamber and outlet. The outlet may be offset to an extent up to that indicated in broken lines. The outlet axis 40 then misses the rotor axis 41 by a distance equal to the difference between the external radius 42 of the annular chamber 43 and the external radius 44 of the annular bearing 45.

I claim:

1. An aircraft propulsion power unit comprising: an axial flow compressor including a casing with a front intake end and a rear discharge end, and a rotor mounted within the casing on a fore-and-aft axis of rotation; a gas turbine arranged behind the compressor and including a casing of smaller external diameter than the external diameter of the compressor casing, and a turbine rotor, which is coaxial with the compressor rotor and drivingly connected thereto; an annular chamber between the compressor casing and the turbine casing, connected to receive air from the compressor; a downwardly and laterally directed outlet from the annular chamber, said outlet having an annular bearing means mounted on the outer periphery thereof, the axis of the bearing lying in a transverse plane through the rotor axis which is inclined to the transverse horizontal direction at a droop angle between 15° and 45°, and which approaches the rotor axis to a minimum distance having a magnitude between zero and the difference between the maximum external radii of the compressor casing and of the annular bearing; and the axis of the bearing, as viewed in a direction perpendicular to the said inclined plane, being inclined to the rotor axis at a divergence angle between 50° and 75°; and an elbow nozzle mounted on the annular bearing for a range of angular movement about the axis of the bearing; the nozzle being constructed to deflect air through a deflection angle from the axis of the bearing, the deflection angle having a magnitude between the divergence angle and 8° less than the divergence angle; the droop angle being approximately the complement of the deflection angle; and the inclinations being such that flow through the outlet into the elbow nozzle is directed obliquely downwards, rearwards, and laterally outwards from said annular casing.

2. A power unit according to claim 1 including a second lateral outlet from the annular chamber, and a second elbow nozzle mounted on the second outlet; the second outlet and nozzle being a mirror image of the first outlet and nozzle.

3. A power unit according to claim 1 including an annular downwardly and laterally directed outlet from the annular chamber for gas from the turbine, said further outlet having an annular bearing means mounted on the outer periphery thereof, the axis of the further bearing being substantially parallel to the axis of the bearing which defines the outlet from the annular chamber.

4. A power unit according to claim 1 in which the axis of the bearing is in a plane inclined at about 35° to the transverse horizontal direction, the axis of the bearing, as viewed in a direction perpendicular to the said inclined plane, being inclined at about 60° to the rotor axis, and the nozzle is constructed to deflect air through about 53°.

5. An aircraft having two power units according to claim 1.

References Cited in the file of this patent

UNITED STATES PATENTS

| | | |
|---|---|---|
| 2,912,188 | Singlemann et al. | Nov. 10, 1959 |
| 3,056,258 | Marchant et al. | Oct. 2, 1962 |

FOREIGN PATENTS

| | | |
|---|---|---|
| 861,480 | Great Britain | Feb. 22, 1961 |